(12) United States Patent
Hong et al.

(10) Patent No.: US 12,477,319 B2
(45) Date of Patent: Nov. 18, 2025

(54) MINIMIZATION OF DRIVE TEST METHOD AND APPARATUS, COMMUNICATION DEVICE AND STORAGE MEDIUM

(71) Applicant: Beijing Xiaomi Mobile Software Co., Ltd., Beijing (CN)

(72) Inventors: Wei Hong, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 401 days.

(21) Appl. No.: 18/245,057

(22) PCT Filed: Sep. 25, 2020

(86) PCT No.: PCT/CN2020/117892
§ 371 (c)(1),
(2) Date: Mar. 13, 2023

(87) PCT Pub. No.: WO2022/061762
PCT Pub. Date: Mar. 31, 2022

(65) Prior Publication Data
US 2023/0354009 A1    Nov. 2, 2023

(51) Int. Cl.
H04W 8/18 (2009.01)
H04W 88/06 (2009.01)
(52) U.S. Cl.
CPC ............ *H04W 8/183* (2013.01); *H04W 88/06* (2013.01)
(58) Field of Classification Search
CPC ..... H04W 24/10; H04W 24/08; H04W 24/02; H04W 16/18; H04W 76/27; H04W 74/0833; H04W 4/021; H04W 36/0085; H04W 16/28; H04W 24/00; H04W 48/12; H04W 64/00; H04W 76/15; H04W 76/19; H04W 8/22; H04W 92/10
(Continued)

(56) References Cited

U.S. PATENT DOCUMENTS

| 10,716,021 B1 | 7/2020 | Peden et al. |
| 2009/0325572 A1* | 12/2009 | Ji ........................... H04W 24/06 455/424 |

(Continued)

FOREIGN PATENT DOCUMENTS

| CN | 110622534 A | 12/2019 |
| CN | 110692263 A | 1/2020 |

(Continued)

OTHER PUBLICATIONS

ISA State Intellectual Property Office of the People's Republic of China, International Search Report Issued in Application No. PCT/CN2020/117892, Jun. 23, 2021, WIPO, 4 pages.

(Continued)

*Primary Examiner* — Ajibola A Akinyemi
(74) *Attorney, Agent, or Firm* — Volpe Koenig (57) ABSTRACT

The present disclosure provides a minimization of drive test (MDT) method and apparatus, a communication device, and a storage medium. The method is performed by a terminal having multiple SIM cards and includes: based on MDT configuration information of a first SIM card, determining an operation of a second SIM card within a time period for performing MDT by the first SIM card.

16 Claims, 4 Drawing Sheets

(58) Field of Classification Search
USPC .......................................................... 455/558
See application file for complete search history.

(56) References Cited

U.S. PATENT DOCUMENTS

| | | | |
|---|---|---|---|
| 2015/0065106 | A1 | 3/2015 | Catovic et al. |
| 2021/0345152 | A1* | 11/2021 | Kimba Dit Adamou .................... H04W 24/10 |
| 2022/0272560 | A1 | 8/2022 | Hong |
| 2022/0360971 | A1 | 11/2022 | Hong |

FOREIGN PATENT DOCUMENTS

| | | |
|---|---|---|
| CN | 110771196 A | 2/2020 |
| CN | 111314931 A | 6/2020 |

OTHER PUBLICATIONS

State Intellectual Property Office of the People's Republic of China, Office Action and Search Report Issued in Application No. 2020800024175, Sep. 2, 2022, 17 pages. (Submitted with Machine/Partial Translation).

Huawei et al. "Overview of Rel-17 work areas for NR and LTE", 3GPP TSG RAN Meeting #84 Newport Beach, USA, RP-191486, Jun. 6, 2019 (Jun. 6, 2019), 22 pages.

Huawei et al. "MDT support for EN-DC", 3GPP TSG-RAN WG3 #107-e, 24 Feb.-Mar. 6, 2020 E-Meeting R3-201322, Feb. 28, 2020, 46 pages.

ISA State Intellectual Property Office of the People's Republic of China, Written Opinion of the International Searching 1 Authority Issued in Application No. PCT/CN2020/117892, Jun. 23, 2021, WIPO.

* cited by examiner

FIG. 1

Based on MDT configuration information of a first SIM card, determine an operation of a second SIM card within a time period for performing MDT by the first SIM card

Minimization of drive test apparatus 600

Determining module 601

FIG. 6

Minimization of drive test apparatus 700

Receiving module 701

Distributing module 702

Fig. 7

Minimization of drive test apparatus 800

Second sending module 801

MINIMIZATION OF DRIVE TEST METHOD AND APPARATUS, COMMUNICATION DEVICE AND STORAGE MEDIUM

TECHNICAL FIELD

The embodiments of the present disclosure relate to the field of wireless communication but not limited to the field of wireless communication, and in particular to a minimization of drive test method and apparatus, a communication device and a storage medium.

BACKGROUND

Drive test can reflect a status of a network and can achieve direct measurement and evaluation on network performance indexes so as to find the problems of the network. Conventional network optimization is based on drive test data. Network data such as electrical level and quality is collected by using a drive test instrument and these data is analyzed to find network problems, thereby performing network optimization for problematic areas. But this manner usually requires a huge amount of labor, materials and investments as well as highly-experienced network optimization personnel.

Based on researches on minimization of drive test (MDT) by 3rd generation partnership project (3GPP), a terminal is used to measure, report, and obtain parameters for network optimization. However, for a terminal having multiple subscriber identity module (SIM) cards, it is difficult to achieve effective MDT due to mutual influence between multiple card systems.

SUMMARY

The present disclosure provides a minimization of drive test (MDT) method and apparatus, a communication device and a storage medium.

According to a first aspect of embodiments of the present disclosure, there is provided a minimization of drive test (MDT) method, where the method is performed by a terminal having multiple subscriber identity module (SIM) cards. The method includes: based on MDT configuration information of a first SIM card, determining an operation of a second SIM card within a time period for performing MDT by the first SIM card.

In some embodiments, the method further includes: sending the MDT configuration information of the first SIM card of the terminal to the second SIM card of the terminal.

In some embodiments, based on the MDT configuration information of the first SIM card, determining the operation of the second SIM card within the time period for performing MDT by the first SIM card includes: based on the MDT configuration information and preset information of the second SIM card, determining the operation of the second SIM card within the time period for performing MDT by the first SIM card, where the preset information of the second SIM card includes at least one of a number of reception antennas configured for the second SIM card and state information of the second SIM card.

In some embodiments, based on the MDT configuration information and the preset information of the second SIM card, determining the operation of the second SIM card within the time period for performing MDT by the first SIM card includes one of:

based on the MDT configuration information and the preset information of the second SIM card, determining that the second SIM card stops receiving data within the time period for performing MDT by the first SIM card; or, based on the MDT configuration information and the preset information of the second SIM card, determining that the second SIM card uses a reception antenna different from a reception antenna used by the first SIM card for performing MDT to continue receiving data within the time period for performing MDT by the first SIM card.

In some embodiments, based on the MDT configuration information and the preset information of the second SIM card, determining the operation of the second SIM card within the time period for performing MDT by the first SIM card includes: in response to determining that the second SIM card is in a connected state and configured with a plurality of reception antennas, based on the MDT configuration information and a number of reception antennas used by the first SIM card to perform MDT in the plurality of reception antennas, determining the operation of the second SIM card within the time period for performing MDT by the first SIM card.

In some embodiments, based on the MDT configuration information and the number of reception antennas used by the first SIM card to perform MDT in the plurality of reception antennas, determining the operation of the second SIM card within the time period for performing MDT by the first SIM card includes one of: in response to determining that the plurality of reception antennas configured for the second SIM card are all provided for the first SIM card to perform MDT, based on the MDT configuration information, determining that the second SIM card stops receiving data within the time period for performing MDT by the first SIM card; or, in response to determining that at least one of the plurality of reception antennas configured for the second SIM card is not allocated to the first SIM card for performing MDT, determining that the second SIM card uses a reception antenna different from a reception antenna used by the first SIM card to continue receiving data within the time period for performing MDT by the first SIM card.

In some embodiments, based on the MDT configuration information and the preset information of the second SIM card, determining the operation of the second SIM card within the time period for performing MDT by the first SIM card includes: in response to determining that the second SIM card is in a connected state and configured with a single reception antenna, based on the MDT configuration information, determining that the second SIM card stops receiving data within the time period for performing MDT by the first SIM card.

In some embodiments, based on the MDT configuration information, determining the operation of the second SIM card within the time period for performing MDT by the first SIM card includes: in response to determining that the second SIM card is in a connected state, based on the MDT configuration information, sending auxiliary information to a second base station; where the auxiliary information is used to trigger the second base station to distribute indication information; and receiving the indication information for indicating the operation of the second SIM card within the time period for performing MDT by the first SIM card.

In some embodiments, the auxiliary information includes: the MDT configuration information, provided for the second base station to determine a time domain resource of the second SIM card for receiving data; and time division multiplexing (TDM) pattern information determined based on the MDT configuration information, where the TDM pattern information at least indicates a suggested time domain resource of the second SIM card for receiving data, and the suggested time domain resource of the second SIM card for receiving data is different from a time domain resource of the first SIM card for performing MDT.

In some embodiments, based on the MDT configuration information and the preset information of the second SIM card, determining the operation of the second SIM card within the time period for performing MDT by the first SIM card includes one of: in response to determining that the second SIM card is in an idle state or an inactive state and configured with a single reception antenna, determining that MDT is performed by the second SIM card within a time period other than the time period for performing MDT by the first SIM card; or, in response to determining that the second SIM card is in an idle state or inactive state and configured with a plurality of reception antennas, determining that the second SIM card and the first SIM card use different reception antennas to perform MDT in any time period.

In some embodiments, based on the MDT configuration information, determining the operation of the second SIM card within the time period for performing MDT by the first SIM card includes: in response to determining that the second SIM card is an idle state or inactive state, based on the MDT configuration information, locally determining the operation of the second SIM card within the time period for performing MDT by the first SIM card.

In some embodiments, sending the MDT configuration information of the first SIM card of the terminal to the second SIM card of the terminal includes: when the first SIM card is in a connected state, sending the MDT configuration information to the second SIM card; or, when the first SIM card is in an idle state or inactive state, sending the MDT configuration information to the second SIM card.

According to a second aspect of embodiments of the present disclosure, there is provided a minimization of drive test (MDT) method, which is performed by a second base station. The method includes: in response to determining that a second Subscriber Identity Module (SIM) card of a terminal is in a connected state, receiving auxiliary information sent by the second SIM card based on MDT configuration information of a first SIM card; where the auxiliary information is used to trigger the second base station to distribute indication information; and based on the auxiliary information, distributing to the second SIM card the indication information for indicating an operation of the second SIM card within a time period for performing MDT by the first SIM card.

In some embodiments, the auxiliary information includes: the MDT configuration information, where the MDT configuration information is provided for the second base station to determine a time domain resource of the second SIM card for receiving data; and time division multiplexing (TDM) pattern information determined based on the MDT configuration information, where the TDM pattern information at least indicates a suggested time domain resource of the second SIM card for receiving data, and the suggested time domain resource of the second SIM card for receiving data is different from a time domain resource of the first SIM card for performing MDT.

According to a third aspect of embodiments of the present disclosure, there is provided a minimization of drive test (MDT) method, which is performed by a first base station. The method includes: in response to determining that a first subscriber identity module (SIM) card of a terminal is to perform MDT, when the first SIM card and the first base station are in a connected state, sending MDT configuration information to the first SIM card.

According to a fourth aspect of embodiments of the present disclosure, there is provided a minimization of drive test (MDT) apparatus, which is applied to a terminal having multiple subscriber identity module (SIM) cards. The apparatus includes: a determining module, configured to, based on MDT configuration information of a first SIM card, determine an operation of a second SIM card within a time period for performing MDT by the first SIM card.

According to a fifth aspect of embodiments of the present disclosure, there is provided a minimization of drive test (MDT) apparatus, which is applied to a second base station. The apparatus includes: a receiving module, configured to, in response to determining that a second subscriber identity module (SIM) card of a terminal is in a connected state, receive auxiliary information sent by the second SIM card based on MDT configuration information of a first SIM card; where the auxiliary information is used to trigger the second base station to distribute indication information; a distributing module, configured to, based on the auxiliary information, distribute to the second SIM card the indication information for indicating an operation of the second SIM card within a time period for performing MDT by the first SIM card.

According to a sixth aspect of embodiments of the present disclosure, there is provided a minimization of drive test (MDT) apparatus, which is applied to a first base station. The apparatus includes: a second sending module, configured to, in response to determining that a first subscriber identity module (SIM) card of a terminal is to perform MDT, when the first SIM card and the first base station are in a connected state, send MDT configuration information to the first SIM card.

According to a seventh aspect of embodiments of the present disclosure, there is provided a communication device, where the communication device at least includes a processor and a memory for storing executable instructions run by the processor; the processor is configured to run the executable instructions to perform the steps of the MDT method in any one of the above items.

According to an eighth aspect of embodiments of the present disclosure, there is provided a non-transitory computer readable storage medium, where the computer readable storage medium stores computer executable instructions, and the computer executable instructions are executed by a processor to perform the steps of the MDT method in any one of the above items.

The embodiments of the present disclosure provide an MDT method which is performed by a terminal having multiple SIM cards. The terminal may, based on the MDT configuration information of the first SIM card, determine the operation of the second SIM card within the time period for performing MDT by the first SIM card, so as to reduce interference of the data reception of the second SIM card for performing MDT by the first SIM card. In this way, effective MDT can be performed by the first SIM card; and/or, influence of performing MDT by the first SIM card on receiving data by the second SIM card can be reduced.

BRIEF DESCRIPTION OF THE DRAWINGS

The accompanying drawings, which are incorporated in and constitute a part of the present description, illustrate embodiments consistent with the present disclosure and serve to explain the principles of the present disclosure together with the description.

DETAILED DESCRIPTION OF THE EMBODIMENTS

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

In order to better describe any embodiment of the present disclosure, illustrative descriptions are made to an embodiment of the present disclosure with one application scenario of access control as an example.

Figure 1:
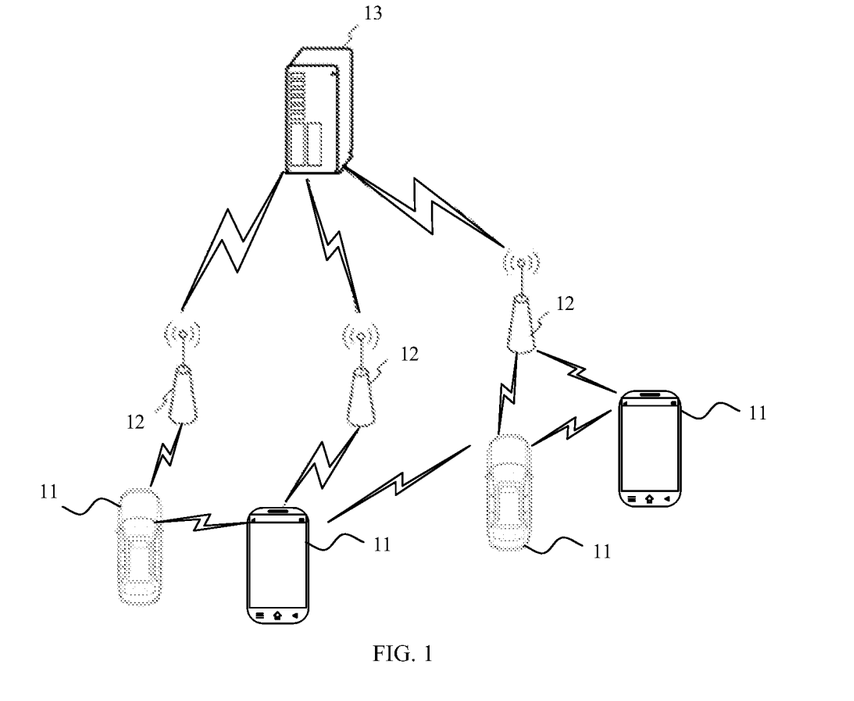
FIG. 1 is a structural schematic diagram illustrating a wireless communication system according to an exemplary embodiment of the present disclosure.

FIG. 1 is a structural schematic diagram illustrating a wireless communication system according to an embodiment of the present disclosure. As shown in FIG. 1, the wireless communication system is a communication system based on cellular mobile communication technology and may include a plurality of terminals 11 and a plurality of base stations 12.

The terminal 11 may be a device that provides voice and/or data connectivity to users. The terminal 11 may communicate with one or more core networks through a radio access network (RAN). The terminal 11 may be a terminal of internet of things, such as a sensor device, a mobile phone, (or called cellular phone), and a computer having a terminal of internet of things, such as a fixed, portable, pocket-sized, handheld, or computer-inbuilt or vehicle-mounted apparatus, such as station (STA), subscriber unit, subscriber station, mobile station, mobile, remote station, access point, remote terminal, access terminal, user terminal, user agent, user device, or user equipment. Optionally, the terminal 11 may also be a device of an unmanned aerial vehicle, or a vehicle-mounted device, for example, may be a trip computer having wireless communication function, or a wireless communication device externally connected to a trip computer. Optionally, the terminal 11 may be a roadside device, for example, may be a road lamp, signal lamp or other roadside devices having wireless communication function.

The base station 12 may be a network side device in a wireless communication system. The wireless communication system may be a fourth-generation mobile communication technology (4G) system, which is also called long term evolution (LTE) system. Optionally, the wireless communication system may also be a 5G system, which is also called new radio (NR) system or 5G NR system. Optionally, the wireless communication system may also be a next generation system of the 5G system. An access network in the 5G system may be referred to as new generation-radio access network (NG-RAN).

The base station 12 may be an evolved node-B (eNB) employed in the 4G system. Optionally, the base station 12 may also be a generation node-B (gNB) in the 5G system using a centralized distributed architecture. When adopting the centralized distributed architecture, the base station 12 usually includes a central unit (CU) and at least two distributed units (DU). In the central unit, protocol stacks of a packet data convergence protocol (PDCP) layer, a radio link control (RLC) layer and a media access control (MAC) layer are disposed. In the distributed unit, a physical (PHY) layer protocol stack is disposed. The specific implementations of the base station 12 are not limited in the embodiments of the present disclosure.

Wireless connection may be established between the base station 12 and the terminal 11 through a wireless air interface. In different implementations, the wireless air interface is a wireless air interface based on the fourth generation mobile communication network technology (4G) standard; or, the wireless air interface is a wireless air interface based on the fifth generation mobile communication network technology (5G) standard, for example, the wireless air interface is a new air interface; or, the wireless air interface may also be a wireless air interface based on a next generation mobile communication network technology standard of 5G.

In some embodiments, end to end (E2E) connection may also be established between the terminals 11, for example, in the scenarios of vehicle to vehicle (V2V) communication, vehicle to infrastructure (V2I) communication, and vehicle to pedestrian (V2P) communication and the like in vehicle to everything (V2X) communication.

In some embodiments, the above wireless communication system may further include a network management device 13.

A plurality of base stations 12 are connected to the network management device 13 respectively. The network management device 13 may be a core network device in the wireless communication system, for example, the network management device 13 may be a mobility management entity (MME) in an evolved packet core (EPC). Alternatively, the network management device may also be another core network device, such as serving gate way (SGW), public data network gate way (PGW), policy and charging rules function (PCRF), or home subscriber server (HSS). The implementation morphology of the network management device 13 is not limited in the embodiments of the present disclosure.

In an embodiment of the present disclosure, performing a minimization of drive test (MDT) by using a terminal can reduce drive test overhead, and shorten the optimization cycle so as to lower the network optimization and maintenance costs of the mobile communication operators. Further, the MDT can collect full-region measurement information (e.g., narrow roads, forests, and private venues and the like) that cannot be obtained in the conventional drive test. Therefore, more objective evaluation can be performed on network performance and the result of the network evaluation is made closer to user experiences, bringing higher user satisfaction.

From the perspective of environmental protection, since conventional drive test requires data collection by test vehicles in urban districts, the MDT can reduce an emission amount of carbon dioxide by less conventional drive tests, so as to provide protection to the environment.

Figure 2:
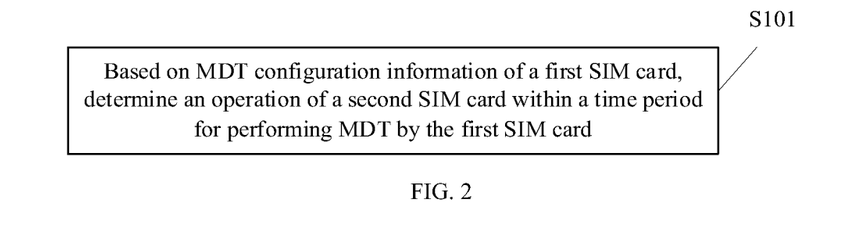
FIG. 2 is a flowchart 1 illustrating an MDT method according to an exemplary embodiment of the present disclosure.

As shown in FIG. 2, an embodiment of the present disclosure provides a minimization of drive test (MDT) method, which is performed by a terminal having multiple subscriber identity module (SIM) cards. The method includes the following step S101.

At step S101, based on MDT configuration information of a first SIM card, an operation of a second SIM card within a time period for performing MDT by the first SIM card is determined.

In an embodiment, in order to make MDT more effective, its application scenarios may include: coverage optimization, capacity optimization, mobile optimization and QoS guarantee and the like.

The MDT is usually initiated by operation administration and maintenance (OAM) which is in charge of activation of the MDT function. The activation of the MDT function includes: activation of the MDT based on administration/region: the OAM specifies a specific tracking area (TA) or cell for performing MDT and/or activation of the MDT based on signaling: the OAM specifies a specific user equipment (UE) for performing MDT, by using international mobile subscriber identity (IMSI)/international mobile equipment identity (IMEI).

For a multi-card terminal, for example, a dual-card dual-standby mobile phone, two IMEIs may be applied for, where each IMSI corresponds to one IMEI. Network considers that different SIM cards correspond to different terminals. The multi-card terminal may perform independent data transmission with the network through a plurality of SIM cards respectively.

In an embodiment of the present disclosure, the first SIM card may be one SIM card of the terminal, and the second SIM card may be one or more SIM cards different from the first SIM card in the terminal. Hence, based on the MDT configuration information of the first SIM card, an operation of one or more of the second SIM cards can be determined.

Herein, the first SIM card and the second SIM card may be SIM cards of same type, or SIM cards of different types, such as a standard SIM card, a mini SIM card, a micro SIM card, a nano SIM card etc.

Therefore, in an embodiment of the present disclosure, in order to avoid affecting an MDT detection result between multiple cards, when MDT configuration information is present in the first SIM card, an operation of the second SIM card may be determined based on the MDT configuration information of the first SIM card. That is, the relevant information representing that MDT is to be performed by the first SIM card is synchronized to the second SIM card, such that the second SIM card will not interfere with the first SIM card within a time period for performing MDT by the first SIM card.

In an embodiment of the present disclosure, the terminal at least includes the first SIM card and the second SIM card, where the second SIM card may include one or more cards. The first SIM card can be used to perform MDT, and the terminal can determine an operation of the second SIM card based on the MDT configuration information of the first SIM card. For example, within a time period for performing MDT by the first SIM card, it is determined that the second SIM card stops receiving data so as to reduce the influence of the second SIM card on the first SIM card. For another example, within the time period for performing MDT by the first SIM card, it is determined that the second SIM card uses an antenna different from an antenna used by the first SIM card to receive data, so as to reduce influence on the first SIM card and the like.

Compared with a solution in which multiple SIM cards in the terminal, as an independent user, perform communication with a network, the MDT configuration information in multiple cards is synchronized in an embodiment of the present disclosure. In this case, when MDT is to be performed by one SIM card, the terminal may determine an operation of another SIM card based on the MDT configuration information, thereby reducing occurrence of MDT unavailability due to mutual influence between multiple SIM cards.

In some embodiments, the method further includes: sending the MDT configuration information of the first SIM card of the terminal to the second SIM card of the terminal.

In an embodiment of the present disclosure, when MDT configuration is present in the first SIM card, the terminal may send the MDT configuration information to the second SIM card, so as to achieve synchronization of MDT configuration-related information between multiple SIM cards. Therefore, the operation of the second SIM card may be adjusted based on the MDT configuration information.

In some embodiments, based on the MDT configuration information of the first SIM card, determining the operation of the second SIM card within the time period for performing MDT by the first SIM card includes: based on the MDT configuration information and preset information of the second SIM card, determining the operation of the second SIM card within the time period for performing MDT by the first SIM card, where the preset information of the second SIM card includes a number of reception antennas configured for the second SIM card and/or state information of the second SIM card.

In an embodiment of the present disclosure, the time period for performing MDT by the first SIM card may be determined based on the MDT configuration information. Within this time period, the operation of the second SIM card may be determined based on the preset information of the second SIM card. For the preset information of different second SIM cards, the second SIM cards may have different operations.

The above preset information may include the state information of the second SIM card. It can be understood that the state of the second SIM card may be a connected state, an idle state or an inactive state or the like. In different states, the second SIM card may have different impacts on the first SIM card. For example, in a connected state, the second SIM card may receive data, which may affect MDT performed by the first SIM card. Therefore, when the second SIM card is in a connected state, it is determined that the second SIM card stops receiving data within the time period for performing MDT by the first SIM card.

For another example, in an idle state or inactive state, the second SIM card does not receive data, which may not affect MDT performed by the first SIM card. Hence, it is determined that the second SIM card remains in an idle state or inactive state, namely, does not perform state switching within the time period for performing MDT by the first SIM card.

Furthermore, the above preset information may also include the number of reception antennas configured for the second SIM card. If the second SIM card is configured with more than one reception antenna, at least one antenna is allocated for the first SIM card to perform MDT and an antenna different from the above antenna is used to receive data within the time period for performing MDT by the first SIM card. Thus, even if the second SIM card is in a connected state, the influence on MDT performed by the first SIM card can be reduced.

In some embodiments, based on the MDT configuration information and the preset information of the second SIM card, determining the operation of the second SIM card within the time period for performing MDT by the first SIM card includes: based on the MDT configuration information and the preset information of the second SIM card, determining that the second SIM card stops receiving data within the time period for performing MDT by the first SIM card; and/or, based on the MDT configuration information and the preset information of the second SIM card, determining that the second SIM card uses a reception antenna different from an antenna used by the first SIM card to perform MDT to continue receiving data within the time period for performing MDT by the first SIM card.

Herein, based on the MDT configuration information of the first SIM card and the preset information of the second SIM card, it can be determined whether performing, by the second SIM card, data reception within the time period for performing MDT by the first SIM card has impact on MDT performed by the first SIM card. Hence, based on the MDT configuration information and the above preset information, it is determined that the second SIM card stops receiving data or uses a reception antenna different from a reception antenna used by the first SIM card to continue receiving data within the time period for performing MDT by the first SIM card.

Further, when the second SIM card is configured with a plurality of reception antennas, it can also be determined that the second SIM card stops receiving data, so as to minimize influence on the MDT performed by the first SIM card.

In some embodiments, based on the MDT configuration information and the preset information of the second SIM card, determining the operation of the second SIM card within the time period for performing MDT by the first SIM card includes: in response to determining that the second SIM card is in a connected state and configured with a plurality of reception antennas, based on the MDT configuration information and a number of reception antennas used by the first SIM card to perform MDT in the plurality of reception antennas, determining the operation of the second SIM card within the time period for performing MDT by the first SIM card.

In an embodiment of the present disclosure, if the second SIM card is in a connected state, the second SIM card may receive data issued by a base station and thus may have impact on MDT performed by the first SIM card. If the second SIM card is configured with a plurality of reception antennas, an antenna different from the antenna of the first SIM card can be used. But, if MDT performed by the first SIM card occupies the plurality of reception antennas configured for the second SIM card, there is no reception antenna for the second SIM card to receive data. At this time, if data is still received by the second SIM card, influence will be brought to MDT performed by the first SIM card.

Therefore, when the second SIM card is in a connected state and configured with a plurality of reception antennas, the operation of the second SIM card may be determined based on the time period for performing MDT by the first SIM card, which is determined based on the MDT configuration information, and a number of reception antennas allocated for the first SIM card to perform MDT in the above plurality of reception antennas. If the number of reception antennas allocated for the first SIM card to perform MDT is same as the total number of reception antennas, it is determined that the second SIM card stops receiving data within the time period. If the number of reception antennas allocated for the first SIM card to perform MDT is less than the total number of reception antennas, it is determined that the second SIM card uses a reception antenna other than the reception antenna used by the first SIM card to perform MDT to continue receiving data within the time period.

In this way, different antennas can be effectively used and influence between multiple SIM cards can be minimized. Thus, the MDT efficiency is improved and use of the second SIM card can be maintained as possible.

In some embodiments, based on the MDT configuration information and the number of reception antennas used by the first SIM card to perform MDT in the plurality of reception antennas, determining the operation of the second SIM card within the time period for performing MDT by the first SIM card includes: in response to determining that the plurality of reception antennas configured for the second SIM card are all provided for the first SIM card to perform MDT, based on the MDT configuration information, determining that the second SIM card stops receiving data within the time period for performing MDT by the first SIM card; or, in response to determining that at least one of the plurality of reception antennas configured for the second SIM card is not allocated to the first SIM card for performing MDT, determining that the second SIM card uses a reception antenna different from a reception antenna used by the first SIM card to continue receiving data within the time period for performing MDT by the first SIM card.

When the second SIM card is in a connected state and configured with a plurality of reception antennas, the operation of the second SIM card within the time period for performing MDT by the first SIM card may be determined based on the above two cases, where the two cases include stopping receiving data and continuing receiving data. It can be understood that, the principle of the above operations is to reduce the influence of the second SIM card on MDT performed by the first SIM card. Therefore, it should be guaranteed that the second SIM card does not use the same reception antenna for data reception as the first SIM card within the time period for performing MDT by the first SIM card. In this way, influence on the MDT performed by the first SIM card can be minimized so as to obtain more accurate detection data.

In some embodiments, based on the MDT configuration information and the preset information of the second SIM card, determining the operation of the second SIM card within the time period for performing MDT by the first SIM card includes: in response to determining that the second SIM card is in a connected state and configured with a single reception antenna, based on the MDT configuration information, determining that the second SIM card stops receiving data within the time period for performing MDT by the first SIM card.

In an embodiment of the present disclosure, since it is possible that the second SIM card is configured with a single reception antenna, if the second SIM card continues data reception within the time period for performing MDT by the first SIM card, influence will be easily brought to the first SIM card, leading to inaccurate MDT data. Thus, no useful MDT data can be obtained.

Hence, when the second SIM card is in a connected state and configured with a single reception antenna, it is determined that the second SIM card stops receiving data within the time period for performing MDT by the first SIM card. Thus, the first SIM card can obtain a useful MDT result.

Figure 3:
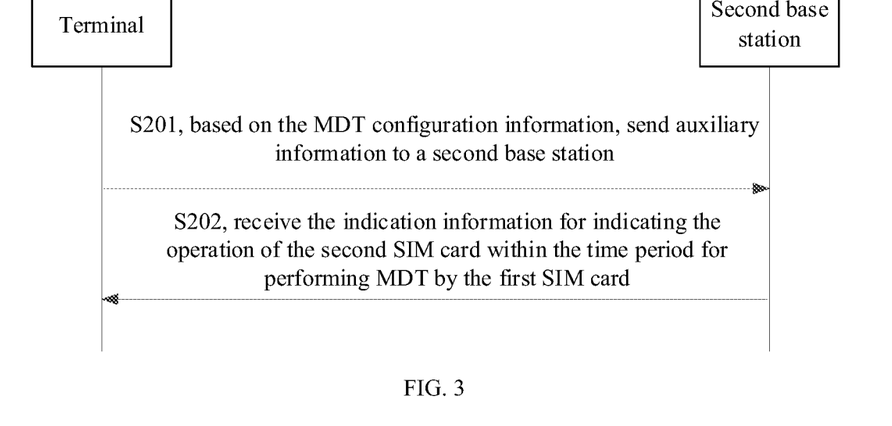
FIG. 3 is a flowchart 2 illustrating an MDT method according to an exemplary embodiment of the present disclosure.

In some embodiments, as shown in FIG. 3, based on the MDT configuration information, determining the operation of the second SIM card within the time period for performing MDT by the first SIM card includes the following steps S201 and S202.

At step S201, in response to determining that the second SIM card is in a connected state, based on the MDT configuration information, auxiliary information is sent to a second base station; where the auxiliary information is used to trigger the second base station to distribute indication information.

At step S202, the indication information for indicating the operation of the second SIM card within the time period for performing MDT by the first SIM card is received.

In an embodiment of the present disclosure, after obtaining the MDT configuration information of the first SIM card, the second SIM card may, based on the MDT configuration information, send auxiliary information to a second base station connected with the second SIM card. Thus, the second base station can learn the MDT information of other SIM cards in the terminal where the second SIM card is located, so as to make indication for the operation of the second SIM card within the time period for performing MDT by the first SIM card.

It is to be noted that the second base station herein is a base station with which the second SIM card establishes communication connection and performs data interaction. Relatively, when the first SIM card in a connected state, network connection and data interaction with the first base station can be performed. The first base station and the second base station may be a same base station or different base stations. For example, when the operators to which the first SIM card and the second SIM card belong are same, they can access a same base station provided by the operator.

When the operators to which the first SIM card and the second SIM card belong are different, they can access different base stations corresponding to different operators.

In an embodiment of the present disclosure, when the second base station learns the MDT configuration-related information based on the auxiliary information, the second base station may, based on the number of reception antennas configured for the second SIM card and the state of the second SIM card and the like, configure the operation of the second SIM card within the time period for performing MDT by the first SIM card, so as to facilitate the second SIM card to perform state switching or stop receiving data within the time period, thereby further reducing the influence on MDT performed by the first SIM card.

In some embodiments, the auxiliary information includes: the MDT configuration information, provided for the second base station to determine a time domain resource of the second SIM card for receiving data; and time division multiplexing (TDM) pattern information determined based on the MDT configuration information, where the TDM pattern information at least indicates a suggested time domain resource of the second SIM card for receiving data, and the suggested time domain resource of the second SIM card for receiving data is different from a time domain resource of the first SIM card for performing MDT.

Herein, when the auxiliary information includes the above MDT configuration information, the second base station may, based on the MDT configuration information, learn the time period for performing MDT by the first SIM card, and further determine the time period in which the second SIM card receives data.

In an embodiment of the present disclosure, the above auxiliary information further includes the TDM pattern information determined based on the MDT configuration information. The TDM pattern information includes a time domain waveform for MDT performed by the first SIM card. Thus, the second base station may, based on the TDM pattern information, determine a time domain waveform for data reception performed by the second SIM card. The MDT performed by the first SIM card and the data reception performed by the second SIM card occupy different time domain resources, that is, time division multiplexing is achieved for the first SIM card and the second SIM card, thereby reducing influence of the second SIM card on the MDT performed by the first SIM card.

In some embodiments, based on the MDT configuration information and the preset information of the second SIM card, determining the operation of the second SIM card within the time period for performing MDT by the first SIM card includes: in response to determining that the second SIM card is in an idle state or an inactive state and configured with a single reception antenna, determining that MDT is performed by the second SIM card within a time period other than the time period for performing MDT by the first SIM card; or, in response to determining that the second SIM card is in an idle state or inactive state and configured with a plurality of reception antennas, determining that the second SIM card and the first SIM card use different reception antennas to perform MDT in any time period.

In an embodiment of the present disclosure, if the second SIM card is in an idle state or inactive state, the second SIM card does not need to receive data and thus will not affect MDT performed by the first SIM card.

Further, in order to realize flexible applications of the MDT of the terminal, MDT can also be performed by the second SIM card. That is, MDT can be performed by multiple SIM cards of the terminal.

When the second SIM card is configured with a single reception antenna, if MDT is performed by the first SIM card and the second SIM card at the same time, conflict may occur, which lead to unavailability of MDT of one of the first SIM card and the second SIM card. In this case, based on the MDT configuration information of the first SIM card, it is determined that MDT is not performed by the second SIM card within the time period for performing MDT by the first SIM card but within another time period. That is, MDT can be performed by multiple SIM cards in different time periods so as to obtain richer detection data.

When the second SIM card is configured with a plurality of reception antennas, it is determined that the first SIM card and the second SIM card use different reception antennas to perform MDT. At this time, mutual influence between the first SIM card and the second SIM card is small and thus, MDT can be performed by the first SIM card and the second SIM card at the same time. In this case, it is only required to allocate the reception antennas without limiting the time periods for performing MDT by different SIM cards. MDT can be performed by multiple SIM cards at any time, so as to improve the flexible application of MDT, and help obtain richer and more accurate detection data.

In some embodiments, based on the MDT configuration information, determining the operation of the second SIM card within the time period for performing MDT by the first SIM card includes: in response to determining that the second SIM card is an idle state or an inactive state, based on the MDT configuration information, locally determining the operation of the second SIM card within the time period for performing MDT by the first SIM card.

In an embodiment of the present disclosure, if the second SIM card is in an idle state or an inactive state, data is not received by the second SIM card, and thus have no impact on MDT performed by the first SIM card. In this case, there is no data interaction or network connection between the second SIM card and the second base station, and the MDT can also be performed by the second SIM card. Hence, the terminal may locally determine the operation of the second SIM card without indication from the second base station.

In some embodiments, sending the MDT configuration information of the first SIM card of the terminal to the second SIM card of the terminal includes: when the first SIM card is in a connected state, sending the MDT configuration information to the second SIM card; or, when the first SIM card is in an idle state or inactive state, sending the MDT configuration information to the second SIM card.

In an embodiment of the present disclosure, if the first base station connected with the first SIM card can be used to indicate to perform MDT by the first SIM card, the first base station may provide the MDT configuration for the first SIM card. After the first SIM card enters an idle state or inactive state, MDT is performed based on the MDT configuration information. Thus, when the first SIM card is still in a connected state after obtaining the MDT configuration information, the MDT configuration information can be sent to the second SIM card; or, when the first SIM card enters an idle state or an inactive state after obtaining the MDT configuration information, the MDT configuration information can be sent to the second SIM card.

For example, when the first SIM card enters an idle state for performing MDT, the first SIM card may send the MDT configuration information to the second SIM card such that the second SIM card determines an operation within the time period for performing MDT by the first SIM card.

Figure 4:
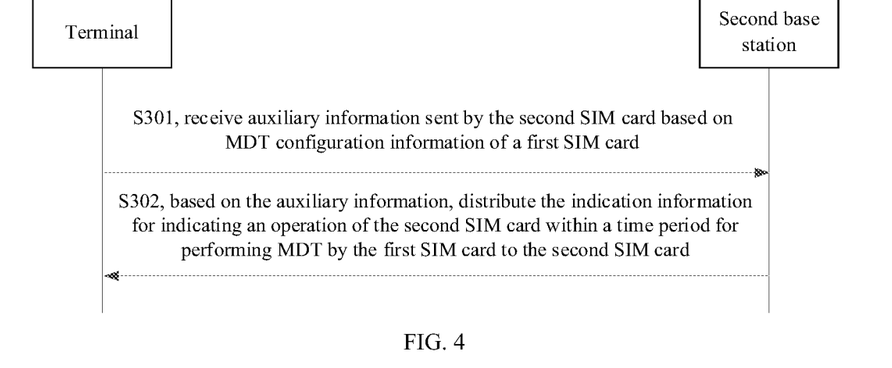
FIG. 4 is a flowchart 3 illustrating an MDT method according to an exemplary embodiment of the present disclosure.

As shown in FIG. 4, an embodiment of the present disclosure provides a minimization of drive test (MDT) method, which is performed by a second base station. The method includes the following steps S301 and S302.

At step S301, in response to determining that a second subscriber identity module (SIM) card of a terminal is in a connected state, auxiliary information sent by the second SIM card based on MDT configuration information of a first SIM card is received; where the auxiliary information is used to trigger the second base station to distribute indication information.

At step S302, based on the auxiliary information, the indication information for indicating an operation of the second SIM card within a time period for performing MDT by the first SIM card is distributed to the second SIM card.

In an embodiment of the present disclosure, the second base station is a base station with which the second SIM card establishes communication connection and performs data interaction. The second base station and the first base station connected with the first SIM card may be a same base station or different base stations.

The second base station may, based on the auxiliary information uploaded by the second SIM card, distribute corresponding indication to the second SIM card, so as to control the operation of the second SIM card within the time period for performing MDT by the first SIM card. The indication information may notify the second SIM card to stop receiving data within the time period or notify the second SIM card of the fact that the second base station will stop sending data to the second SIM card within the time period and so on.

In this way, influence of the communication between the second base station and the second SIM card on the first SIM card being performing MDT can be reduced, further helping the terminal to obtain accurate MDT result.

In some embodiments, the auxiliary information includes: the MDT configuration information, provided for the second base station to determine a time domain resource of the second SIM card for receiving data; and time division multiplexing (TDM) pattern information determined based on the MDT configuration information, where the TDM pattern information at least indicates a suggested time domain resource of the second SIM card for receiving data, and the suggested time domain resource of the second SIM card for receiving data is different from a time domain resource of the first SIM card for performing MDT.

The above auxiliary information is sent by the second SIM card to the second base station, and then the second base station, based on the above auxiliary information, configures the operation of the second SIM card within the time period for performing MDT by the first SIM card. Detailed descriptions have been made to the auxiliary information in the above embodiments and will not be repeated herein.

Figure 5:
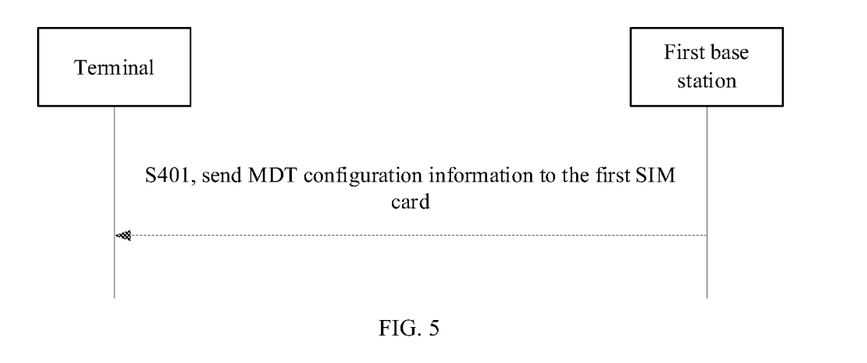
FIG. 5 is a flowchart 4 illustrating an MDT method according to an exemplary embodiment of the present disclosure.

As shown in FIG. 5, an embodiment of the present disclosure provides a minimization of drive test (MDT) method, which is performed by a first base station. The method includes the following step S401.

At step S401, in response to determining that MDT is to be performed by a first SIM card of a terminal, and the first SIM card and the first base station are in a connected state, MDT configuration information is sent to the first SIM card.

In an embodiment of the present disclosure, the first base station is a base station with which the first SIM card of the terminal establishes communication connection and performs data communication. When the first SIM card is in a connected state, the first base station may distribute data or some configuration information to the first SIM card.

When the first SIM card and the first base station are in a connected state, the first base station may distribute the MDT configuration information for performing MDT by the first SIM card to the first SIM card. After receiving the MDT configuration information, the first SIM card can be switched to an idle state based on a time period for performing MDT which is determined based on the MDT configuration information, and in this time period, MDT is performed by the first SIM card. MDT can also be performed by the first SIM card based on the MDT configuration information when the state of the first SIM card is switched to an idle state.

An embodiment of the present disclosure further provides the following example.

In an embodiment of the present disclosure, the first SIM card of the multi-card terminal communicates with the first base station and the second SIM card of the multi-card terminal communicates with the second base station. The first base station and the second base station may be a same base station.

If the first SIM card and the first base station are in a connected state, when the first base station needs the first SIM card to store MDT, the first base station sends a logged measurement configuration signaling to the first SIM card, where the signaling includes configurations for performing MDT after the first SIM card is switched to an idle state, the configurations including measurement cycle, measurement time length, measurement duration and measurement interval and the like.

After receiving the storage MDT configuration information from the first base station, the first SIM card sends the storage MDT configuration information to the second SIM card.

The first SIM card may, after switching to an idle state, send the storage MDT configuration information sent by the first base station to the second SIM card.

The first SIM card may, when remaining in a connected state, send the storage MDT configuration information sent by the first base station to the second SIM card.

After the second SIM card receives the storage MDT configuration information from the first SIM card, if the second SIM card and the second base station are in a connected state, the following two cases are included.

In a first case, if the second SIM card is configured with a single RX antenna: the second SIM card notifies to the second base station the received storage MDT configuration information sent to the first SIM card by the first base station or based on the configuration information, recommends time division multiplexing (TDM) pattern information to the second base station.

After receiving the storage MDT configuration information sent by the first base station to the first SIM card or the TDM pattern information recommended based on the configuration information, the second base station may, based on the configuration information or the recommended TDM pattern information, at least configure TDM pattern information for reception of the first SIM card. In other words, the second SIM card is informed to stop receiving data from the second base station in a time period, and the first SIM card is informed to perform MDT in the time period.

In a second case, if the second SIM card is configured with a plurality of RX antennas, the second SIM card notifies to the second base station the received storage MDT configuration information sent to the first SIM card by the first base station or based on the configuration information, recommends TDM pattern information to the second base station.

After receiving the storage MDT configuration information sent by the first base station to the first SIM card or the TDM pattern information recommended based on the configuration information, the second base station may, based on the configuration information or the recommended TDM pattern information, at least configure TDM pattern information for reception of the first SIM card, that is, the second SIM card is informed to stop receiving data from the second base station in a time period, and the first SIM card is informed to perform MDT in the time period.

After receiving the storage MDT configuration information sent by the first base station to the first SIM card, the second base station may, based on the configuration information, allocate at least one RX antenna for the first SIM card to perform MDT.

If the second SIM card and the second base station are both in an idle state, the following two cases are included.

In a first case, if the second SIM card is configured with a single RX antenna, the terminal itself determines the TDM pattern information, that is, the second SIM card may be used to perform MDT in a time period and the first SIM card may be used to perform MDT in another time period.

In a second case, if the second SIM card is configured with a plurality of RX antennas, the second SIM card and the first SIM card use different antennas to perform MDT.

Figure 6:
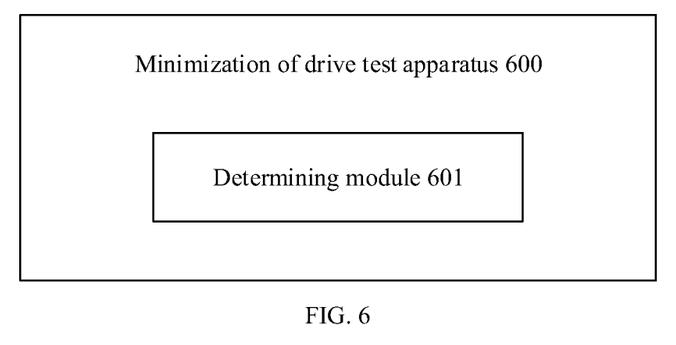
FIG. 6 is a structural block diagram 1 illustrating an MDT apparatus according to an exemplary embodiment of the present disclosure.

As shown in FIG. 6, an embodiment of the present disclosure provides a minimization of drive test (MDT) apparatus 600, which is applied to a terminal having multiple subscriber identity module (SIM) cards. The apparatus 600 includes a determining module 601, configured to, based on MDT configuration information of a first SIM card, determine an operation of a second SIM card within a time period for performing MDT by the first SIM card.

In some embodiments, the apparatus further includes: a first sending module, configured to send the MDT configuration information of the first SIM card of the terminal to the second SIM card of terminal.

In some embodiments, the determining module 601 includes: a first determining sub-module, configured to, based on the MDT configuration information and preset information of the second SIM card, determine the operation of the second SIM card within the time period for performing MDT by the first SIM card, where the preset information of the second SIM card includes at least one of a number of reception antennas configured for the second SIM card and state information of the second SIM card.

In some embodiments, the first determining sub-module includes: a second determining sub-module, configured to, based on the MDT configuration information and the preset information of the second SIM card, determine that the second SIM card stops receiving data within the time period for performing MDT by the first SIM card; or, a third determining sub-module, configured to, based on the MDT configuration information and the preset information of the second SIM card, determine that the second SIM card uses a reception antenna different from an antenna used by the first SIM card for performing MDT to continue receiving data within the time period for performing MDT by the first SIM card.

In some embodiments, the first determining sub-module includes: a fourth determining sub-module, configured to, in response to determining that the second SIM card is in a connected state and configured with a plurality of reception antennas, based on the MDT configuration information and a number of reception antennas used by the first SIM card to perform MDT in the plurality of reception antennas, determine the operation of the second SIM card within the time period for performing MDT by the first SIM card.

In some embodiments, the fourth determining sub-module includes: a fifth determining sub-module, configured to, in response to determining that the plurality of reception antennas configured for the second SIM card are all provided for the first SIM card to perform MDT, based on the MDT configuration information, determine that the second SIM card stops receiving data within the time period for performing MDT by the first SIM card; or, a sixth determining sub-module, configured to, in response to determining that at least one of the plurality of reception antennas configured for the second SIM card is not allocated to the first SIM card for performing MDT, determine that the second SIM card uses a reception antenna different from a reception antenna used by the first SIM card to continue receiving data within the time period for performing MDT by the first SIM card.

In some embodiments, the first determining sub-module includes: a seventh determining sub-module, configured to, in response to determining that the second SIM card is in a connected state and configured with a single reception antenna, based on the MDT configuration information, determine that the second SIM card stops receiving data within the time period for performing MDT by the first SIM card.

In some embodiments, the first determining sub-module includes: an eighth determining sub-module, configured to, in response to determining that the second SIM card is in an idle state or an inactive state and configured with a single reception antenna, determine that MDT is performed by the second SIM card within a time period other than the time period for performing MDT by the first SIM card; or, a ninth determining sub-module, configured to, in response to determining that the second SIM card is in an idle state or inactive state and configured with a plurality of reception antennas, determine that the second SIM card and the first SIM card use different reception antennas to perform MDT in any time period.

In some embodiments, the first determining sub-module includes: a sending sub-module, configured to, in response to determining that the second SIM card is in a connected state, based on the MDT configuration information, send auxiliary information to a second base station; where the auxiliary information is used to trigger the second base station to distribute indication information; and a receiving sub-module, configured to receive the indication information for indicating the operation of the second SIM card within the time period for performing MDT by the first SIM card.

In some embodiments, the auxiliary information includes: the MDT configuration information, provided for the second base station to determine a time domain resource of the second SIM card for receiving data; and time division multiplexing (TDM) pattern information determined based on the MDT configuration information, where the TDM pattern information at least indicates a suggested time domain resource of the second SIM card for receiving data, and the suggested time domain resource of the second SIM card for receiving data is different from a time domain resource of the first SIM card for performing MDT.

In some embodiments, the first determining sub-module includes: a locally-determining sub-module, configured to, in response to determining that the second SIM card is an idle state or inactive state, based on the MDT configuration information, locally determine the operation of the second SIM card within the time period for performing MDT by the first SIM card.

In some embodiments, the sending sub-module includes: a first sending sub-module, configured to, when the first SIM card is in a connected state, send the MDT configuration information to the second SIM card; and a second sending sub-module, configured to, when the first SIM card is in an idle state or inactive state, send the MDT configuration information to the second SIM card.

Figure 7:
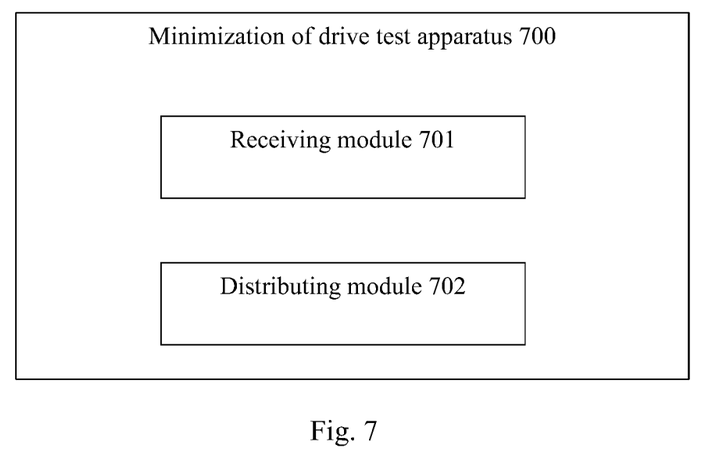
FIG. 7 is a structural block diagram 2 illustrating an MDT apparatus according to an exemplary embodiment of the present disclosure.

As shown in FIG. 7, an embodiment of the present disclosure provides a minimization of drive test (MDT) apparatus 700, which is applied to a second base station. The apparatus 700 includes a receiving module 701 and a distributing module 702.

The receiving module 701 is configured to, in response to determining that a second Subscriber Identity Module (SIM) card of a terminal is in a connected state, receive auxiliary information sent by the second SIM card based on MDT configuration information of a first SIM card; where the auxiliary information is used to trigger the second base station to distribute indication information.

The distributing module 702 is configured to, based on the auxiliary information, distribute to the second SIM card the indication information for indicating an operation of the second SIM card within a time period for performing MDT by the first SIM card.

In some embodiments, the auxiliary information includes: the MDT configuration information, where the MDT configuration information is provided for the second base station to determine a time domain resource of the second SIM card for receiving data; and/or, time division multiplexing (TDM) pattern information determined based on the MDT configuration information, where the TDM pattern information at least indicates a suggested time domain resource of the second SIM card for receiving data, and the suggested time domain resource of the second SIM card for receiving data is different from a time domain resource of the first SIM card for performing MDT.

Figure 8:
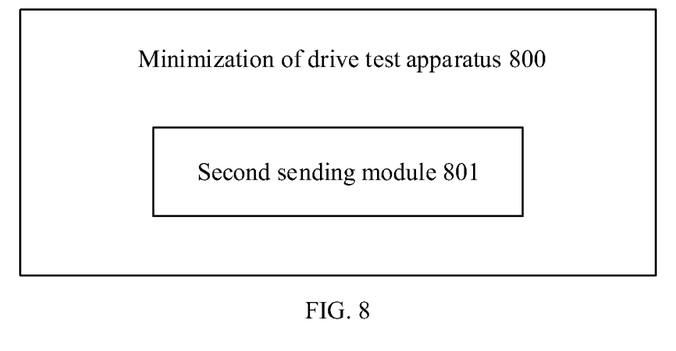
FIG. 8 is a structural block diagram 3 illustrating an MDT apparatus according to an exemplary embodiment of the present disclosure.

As shown in FIG. 8, an embodiment of the present disclosure provides a minimization of drive test (MDT) apparatus 800, which is applied to a first base station. The apparatus 800 includes: a second sending module 801, configured to, in response to determining that a first subscriber identity module (SIM) card of a terminal is to perform MDT, when the first SIM card and the first base station are in a connected state, send MDT configuration information to the first SIM card.

The specific manner in which each module in the apparatuses in the above embodiments performs operations has already been detailed in the method embodiments and will not be repeated herein.

Figure 9:
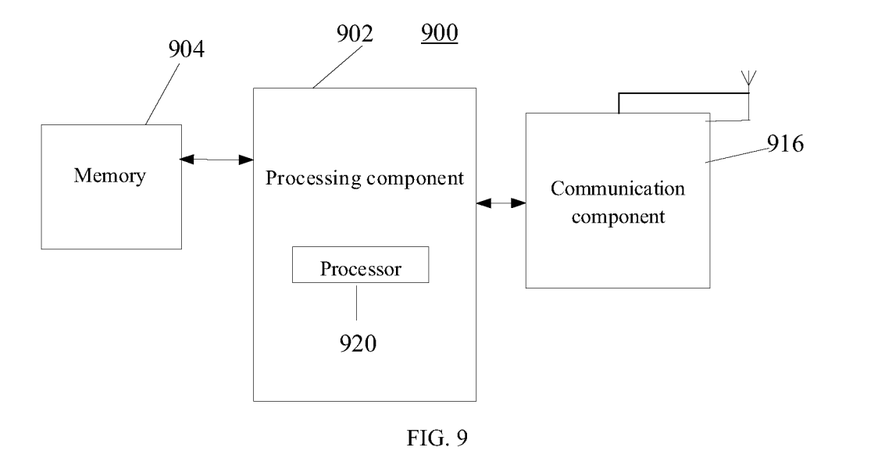
FIG. 9 is a structural schematic diagram 1 illustrating a communication device according to an exemplary embodiment of the present disclosure.

FIG. 9 is a block diagram of a communication device 900 according to an example of the present disclosure. For example, the communication device 900 may be a mobile phone, a computer, a digital broadcast terminal, a message transceiver, a game console, a tablet device, a medical device, a fitness device, a personal digital assistant, and the like.

As shown in FIG. 9, the communication device 900 includes at least one of: a processing component 902, a memory 904 and a communication component 916.

The processing component 902 generally controls overall operations of the communication device 900, such as operations associated with display, phone calls, data communications, camera operations, and recording operations. The processing component 902 may include one or more processors 920 to execute instructions to complete all or part of the steps of the above methods. In addition, the processing component 902 may include one or more modules which facilitate the interaction between the processing component 902 and other components. For example, the processing component 902 may include a multimedia module to facilitate the interaction between the multimedia component 908 and the processing component 902.

The memory 904 is configured to store various types of data to support the operation of the communication device 900. Examples of such data include instructions for any application or method operated on the communication device 900, contact data, phonebook data, messages, pictures, videos, and so on. The memory 904 may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or compact disk.

The communication component 916 is configured to facilitate wired or wireless communication between the communication device 900 and other devices. The communication device 900 may access a wireless network based on a communication standard, such as WiFi, 2G or 3G, or a combination thereof. In an example, the communication component 916 receives broadcast signals or broadcast associated information from an external broadcast management system via a broadcast channel. In an example, the communication component 916 also includes a near field communication (NFC) module to facilitate short range communication. For example, the NFC module may be implemented based on a radio frequency identification (RFID) technology, an infrared data association (IrDA) technology, an ultrawideband (UWB) technology, a blue tooth (BT) technology, and other technologies.

In an example, the communication device 900 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above methods.

In an exemplary embodiment, the present disclosure further provides a non-transitory computer readable storage medium including instructions, such as a memory 904 including instructions, where the above instructions are executed by a processor 920 of the communication device 900 to perform the above method. For example, the non-transitory computer readable storage medium may be a read only memory (ROM), a random access memory (RAM), a CD-ROM, a magnetic tape, a floppy disk, and an optical data storage device and the like.

Figure 10:
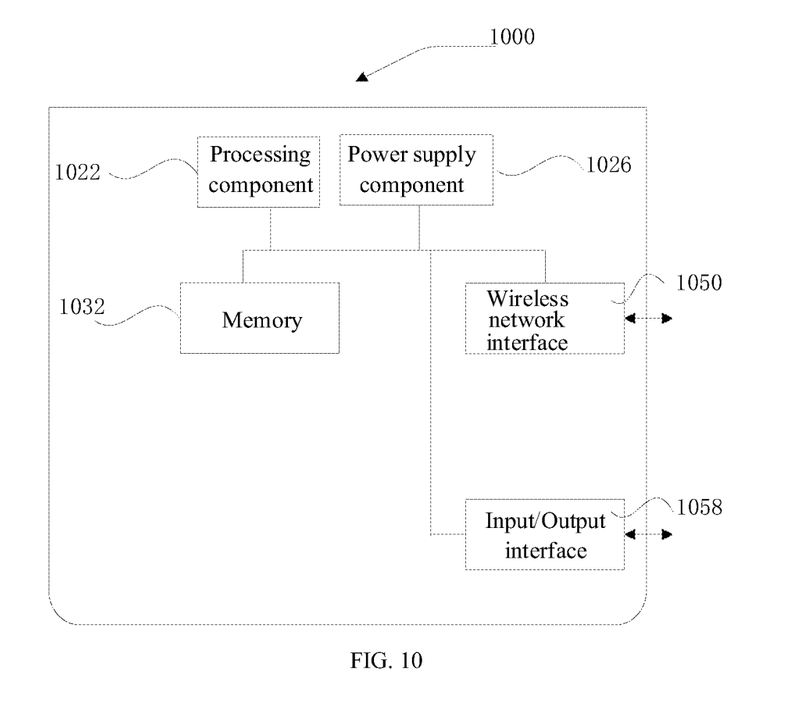
FIG. 10 is a structural schematic diagram 2 illustrating a communication device according to an exemplary embodiment of the present disclosure.

As shown in FIG. 10, an embodiment of the present disclosure provides a structure of another communication device. The communication device 1000 may be the first base station or the second base station involved in the embodiments of the present disclosure. For example, the communication device 1000 may be provided as a network device. By referring to FIG. 10, the communication device 1000 includes a processing component 1022 and further includes at least one processor and a memory resource represented by the memory 1032 for storing instructions executable by the processing component 1022, for example, an application program. The application program stored in the memory 1032 may include one or more modules each of which corresponds to one set of instructions. Furthermore, the processing component 1022 is configured to execute the instructions to perform any method of application of the above method in the communication device.

The communication device 1000 may also include one power supply component 1026 configured to perform power management of the communication device 1000, one wired or wireless network interface 1050 configured to connect the communication device 1000 to a network, and one input/output (I/O) interface 1058. The communication device 1000 may be operated based on an operating system stored in the memory 1032, such as Windows Server™, Mac OS X™, Unix™, Linux™, FreeBSD™ or the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A minimization of drive test (MDT) method, performed by a terminal having multiple subscriber identity module (SIM) cards, and comprising:
    based on MDT configuration information of a first SIM card, determining an operation of a second SIM card within a time period for performing MDT by the first SIM card;
    wherein based on the MDT configuration information of the first SIM card, determining the operation of the second SIM card within the time period for performing MDT by the first SIM card comprises:
    based on the MDT configuration information and preset information of the second SIM card, determining the operation of the second SIM card within the time period for performing MDT by the first SIM card, wherein the preset information of the second SIM card comprises at least one of a number of reception antennas configured for the second SIM card and state information of the second SIM card;
    wherein based on the MDT configuration information and the preset information of the second SIM card, determining the operation of the second SIM card within the time period for performing MDT by the first SIM card comprises:
        in response to determining that the second SIM card is in a connected state and configured with a single reception antenna, based on the MDT configuration information, determining that the second SIM card stops receiving data within the time period for performing MDT by the first SIM card.

2. The method of claim 1, further comprising:
    sending the MDT configuration information of the first SIM card of the terminal to the second SIM card of the terminal.

3. The method of claim 2, wherein sending the MDT configuration information of the first SIM card of the terminal to the second SIM card of the terminal comprises one of:

when the first SIM card is in a connected state, sending the MDT configuration information to the second SIM card; or, when the first SIM card is in an idle state or inactive state, sending the MDT configuration information to the second SIM card.

4. The method of claim 1, wherein, based on the MDT configuration information and the preset information of the second SIM card, determining the operation of the second SIM card within the time period for performing MDT by the first SIM card comprises one of:

based on the MDT configuration information and the preset information of the second SIM card, determining that the second SIM card stops receiving data within the time period for performing MDT by the first SIM card; or, based on the MDT configuration information and the preset information of the second SIM card, determining that the second SIM card uses a reception antenna, different from a reception antenna used by the first SIM card for performing MDT, to continue receiving data within the time period for performing MDT by the first SIM card.

5. The method of claim 1, wherein, based on the MDT configuration information and the preset information of the second SIM card, determining the operation of the second SIM card within the time period for performing MDT by the first SIM card comprises:

in response to determining that the second SIM card is in a connected state and configured with a plurality of reception antennas, based on the MDT configuration information and a number of reception antennas used by the first SIM card to perform MDT in the plurality of reception antennas, determining the operation of the second SIM card within the time period for performing MDT by the first SIM card.

6. The method of claim 5, wherein, based on the MDT configuration information and the number of reception antennas used by the first SIM card to perform MDT in the plurality of reception antennas, determining the operation of the second SIM card within the time period for performing MDT by the first SIM card comprises one of:

in response to determining that the plurality of reception antennas configured for the second SIM card are all provided for the first SIM card to perform MDT, based on the MDT configuration information, determining that the second SIM card stops receiving data within the time period for performing MDT by the first SIM card; or, in response to determining that at least one of the plurality of reception antennas configured for the second SIM card is not allocated to the first SIM card for performing MDT, determining that the second SIM card uses a reception antenna different from a reception antenna used by the first SIM card to continue receiving data within the time period for performing MDT by the first SIM card.

7. The method of claim 5, wherein, based on the MDT configuration information, determining the operation of the second SIM card within the time period for performing MDT by the first SIM card comprises:

in response to determining that the second SIM card is in a connected state, based on the MDT configuration information, sending auxiliary information to a second base station; wherein the auxiliary information is used to trigger the second base station to distribute indication information; and receiving the indication information for indicating the operation of the second SIM card within the time period for performing MDT by the first SIM card.

8. The method of claim 7, wherein the auxiliary information comprises:

the MDT configuration information, provided for the second base station to determine a time domain resource of the second SIM card for receiving data; and time division multiplexing (TDM) pattern information determined based on the MDT configuration information, wherein the TDM pattern information at least indicates a suggested time domain resource of the second SIM card for receiving data, and the suggested time domain resource of the second SIM card for receiving data is different from a time domain resource of the first SIM card for performing MDT.

9. The method of claim 1, wherein, based on the MDT configuration information and the preset information of the second SIM card, determining the operation of the second SIM card within the time period for performing MDT by the first SIM card comprises one of:

in response to determining that the second SIM card is in an idle state or an inactive state and configured with a single reception antenna, determining that MDT is performed by the second SIM card within a time period other than the time period for performing MDT by the first SIM card; or, in response to determining that the second SIM card is in an idle state or inactive state and configured with a plurality of reception antennas, determining that the second SIM card and the first SIM card use different reception antennas to perform the MDT in any time period.

10. The method of claim 9, wherein, based on the MDT configuration information, determining the operation of the second SIM card within the time period for performing MDT by the first SIM card comprises:

in response to determining that the second SIM card is an idle state or inactive state, based on the MDT configuration information, determining, by the terminal, that the operation of the second SIM card within the time period for performing MDT by the first SIM card.

11. A communication device, at least comprising: a processor and a memory for storing executable instructions run by the processor, wherein, the processor is configured to run the executable instructions to perform the minimization of drive test method of claim 1.

12. A minimization of drive test (MDT) method, performed by a second base station, and comprising:

in response to determining that a second subscriber identity module (SIM) card of a terminal is in a connected state, receiving auxiliary information sent by the second SIM card based on MDT configuration information of a first SIM card; wherein the auxiliary information is used to trigger the second base station to distribute indication information; and based on the auxiliary information, distributing to the second SIM card the indication information for indicating an operation of the second SIM card within a time period for performing MDT by the first SIM card, and wherein the operation of the second SIM comprises: in response to determining that the second SIM card is in a connected state and configured with a single reception antenna, based on the MDT configuration information, determining that the second SIM card stops receiving data within the time period for performing MDT by the first SIM card.

13. The method of claim 12, wherein the auxiliary information comprises at least one of:
the MDT configuration information, wherein the MDT configuration information is provided for the second base station to determine a time domain resource of the second SIM card for receiving data; and
time division multiplexing (TDM) pattern information determined based on the MDT configuration information, wherein the TDM pattern information at least indicates a suggested time domain resource of the second SIM card for receiving data, and the suggested time domain resource of the second SIM card for receiving data is different from a time domain resource of the first SIM card for performing MDT.

14. A communication device, at least comprising: a processor and a memory for storing executable instructions run by the processor, wherein,
the processor is configured to run the executable instructions to perform the minimization of drive test method of claim 12.

15. A minimization of drive test (MDT) method, performed by a first base station, and comprising:
in response to determining that a first subscriber identity module (SIM) card of a terminal is to perform MDT, and the first SIM card and the first base station are in a connected state, sending MDT configuration information to the first SIM card, wherein the MDT configuration information is configured for determining an operation of a second SIM card within a time period for performing MDT by the first SIM card, and
wherein the operation of the second SIM comprises: in response to determining that the second SIM card is in a connected state and configured with a single reception antenna, based on the MDT configuration information, determining that the second SIM card stops receiving data within the time period for performing MDT by the first SIM card.

16. A communication device, at least comprising: a processor and a memory for storing executable instructions run by the processor, wherein,
the processor is configured to run the executable instructions to perform the minimization of drive test method of claim 15.

* * * * *